(No Model.)
S. H. DIXSON.
APPARATUS FOR PREVENTING RAILROADS FROM BEING BLOCKADED WITH SNOW.
No. 490,545.  Patented Jan. 24, 1893.
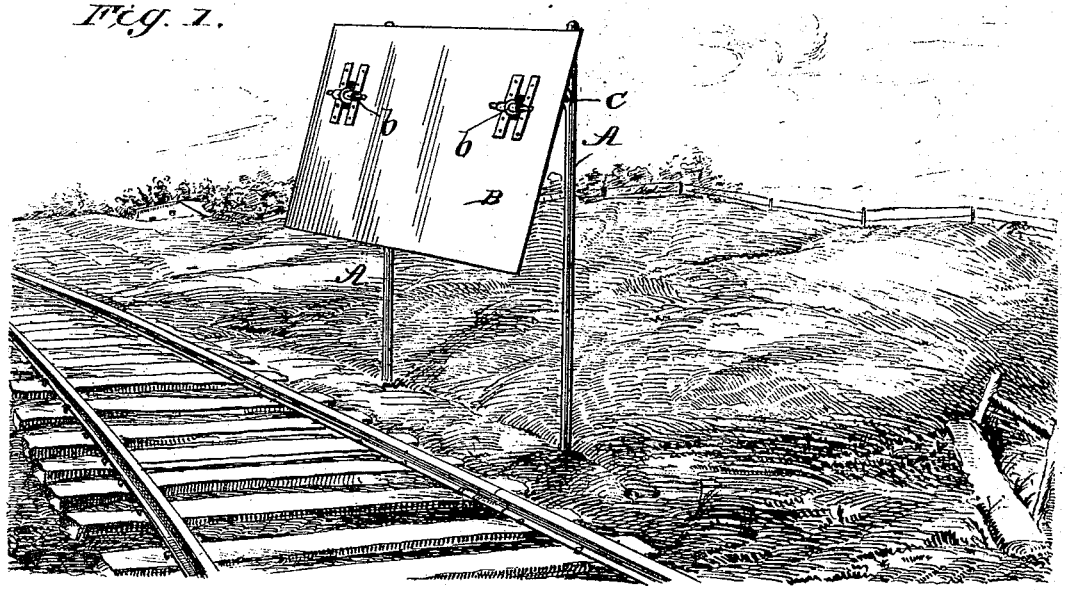
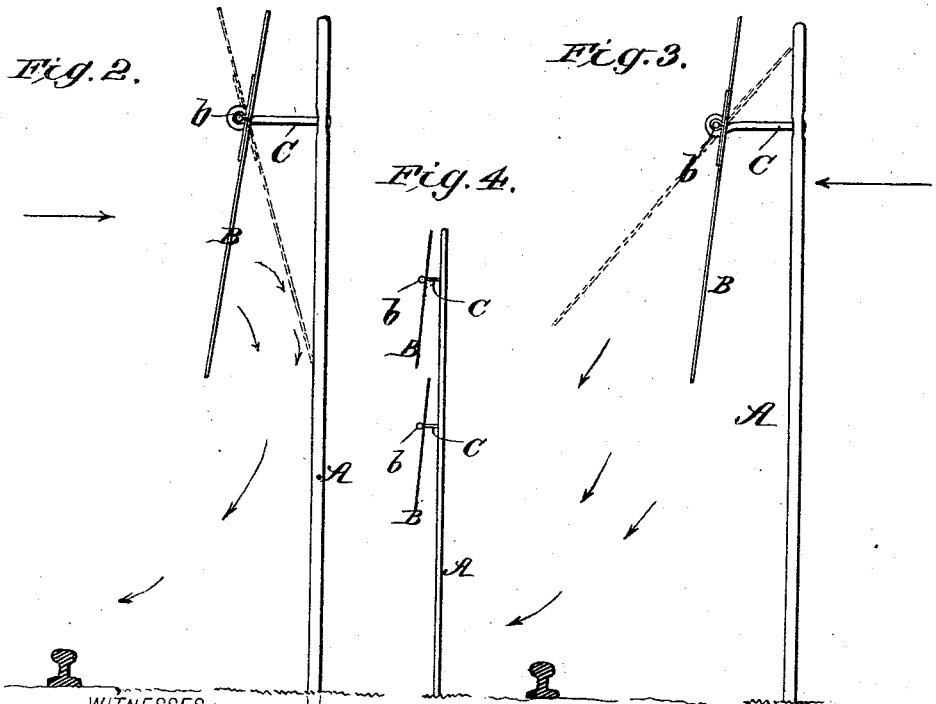
WITNESSES:
Fred G. Dieterich
Jos. A. Ryan
INVENTOR:
Simon H. Dixson
BY Munn & Co
ATTORNEYS

UNITED STATES PATENT OFFICE.

SIMON H. DIXSON, OF CLEGHORN, IOWA.

APPARATUS FOR PREVENTING RAILROADS FROM BEING BLOCKADED WITH SNOW.

SPECIFICATION forming part of Letters Patent No. 490,545, dated January 24, 1893.

Application filed February 17, 1892. Serial No. 421,911. (No model.)

*To all whom it may concern:*

Be it known that I, SIMON H. DIXSON, of Cleghorn, in the county of Cherokee and State of Iowa, have invented a new and useful Apparatus for Preventing Railroads from being Blockaded with Snow, of which the following is a specification.

My invention is an apparatus for preventing railroads from being blockaded with snow, and has for an object to insure the blowing of the snow from the track by directing the wind currents downward onto the track; and the invention consists in the method and novel construction and combination of parts hereinafter described and pointed out in the claims.

In the drawings—Figure 1 is a perspective view of my improvement as in use. Figs. 2 and 3 are edge views thereof and Fig. 4 shows a conductor provided with two wings one above the other.

In carrying out my invention I provide a wind conductor located alongside of the track at the point or points where the accumulation of snow is feared and adapted for adjustment to direct the wind whether coming in one or the opposite direction across the track down onto the track so that its maximum force will be exerted to blow the snow off the track at such point. The conductor is shown as comprising a suitable supporting frame which may be two uprights or posts A as shown and the wing or wings B, pivoted or hinged at *b* to the frame and arranged to tilt or be tilted to incline at its lower edge toward or from the track as will be understood from the drawings. It is preferred to arrange the wing as shown in Figs. 1 and 2 so that it will automatically shift by the wind pressure to accommodate itself to the changes of the wind but manifestly the specific construction may be varied without departing from some of the broad principles of my invention.

It will be seen that if the wind be blowing from the side of the track opposite the conductor and the wing is adjusted to incline toward its lower edge away from the track the wind will be guided downward and directed onto the track and will thereby operate to blow the snow off. If however the wind is blowing from the opposite direction or in rear of the conductor and the latter be tilted to incline toward its lower edge in the direction of the track it will be seen that the wind will be directed downward under the wing and onto and across the track and operate to effectually clear the snow therefrom. It will be understood that these conductors are placed at such points on the road as are otherwise likely to become blockaded by snow. In the self adjusting construction of wings as shown in Figs. 1 and 2 the pressure of the wind on one side or the other operates to tilt the wing to incline it to properly direct the wind onto the track as before indicated. It may in some instances be preferred to employ two or more wings one above the other as shown.

In the preferred construction the uprights A are provided with projecting arms C to which the wings are hinged. These arms are arranged below the upper ends of the uprights so that the portions of said uprights above the said arms serve as stops for the upper end of the wing while the portions of the upright below the arms form stops for the lower end of the wing as will be readily understood from the drawings. The hinge is arranged slightly above the middle of the wing so that the pressure of the wind against its lower portion will properly operate to automatically adjust the wing.

On roads running east and west it is usually only necessary to arrange the wind guides or conductors on the north side of the track but on roads running north and south owing to the severe winds which come sometimes from the northwest and sometimes from the northeast it becomes necessary to use the guides on both sides of the track.

Having thus described my invention, what I claim as new is:

1. An apparatus substantially as described consisting of the uprights or posts provided with the projecting arms, and the wing hinged to said arms at points slightly above its middle, the uprights being extended above the arms whereby the uprights will form stops for both the upper and lower ends of the wing all substantially as set forth.

2. In an apparatus substantially as described, the combination of the uprights the arms projecting from said uprights and the wing pivotally jointed to said arms whereby it is supported at one side of and may swing toward and from the uprights substantially as set forth.

3. The improved wind conductor substantially as herein described consisting of the uprights A, the arms C projecting laterally from the said uprights, and the wing pivotally jointed to said arms C eccentrically between its upper and lower edges whereby it may be automatically swung to its different adjustments by wind pressure all substantially as and for the purposes set forth.

4. In a wind conductor the combination of the support having uprights A and the wing arranged to one side of the uprights A and pivotally connected with the support below the upper ends of the uprights A whereby the wing may abut and be stopped by the said uprights in both its adjustments substantially as set forth.

5. An improved wind conductor comprising a support or frame and a deflecting wing pivoted to said support or frame eccentrically between its upper and lower edges whereby the said wing will be adjusted upon its pivot by the wind pressure acting directly against the said wing all substantially as and for the purposes set forth.

SIMON H. DIXSON.

Witnesses:
E. C. WILSON,
M. HENKER.